United States Patent [19]

Stemme et al.

[11] 4,309,097
[45] Jan. 5, 1982

[54] STILL-CAMERA FILM TRANSPORT SYSTEM WITH MOTOR DEENERGIZATION AT END OF FILM

[75] Inventors: Otto Stemme, Munich; Peter Lermann, Narring; Karl Wagner, Munich; Dieter Engelsmann, Unterhaching; Rolf Schröder, Baldham, all of Fed. Rep. of Germany

[73] Assignee: AGFA-Gevaert AG, Leverkusen, Fed. Rep. of Germany

[21] Appl. No.: 104,900

[22] Filed: Dec. 18, 1979

Related U.S. Application Data

[63] Continuation of Ser. No. 955,475, Oct. 26, 1978, abandoned.

[30] Foreign Application Priority Data

Oct. 28, 1977 [DE] Fed. Rep. of Germany ....... 2748557

[51] Int. Cl.$^3$ .............................................. G03B 1/00
[52] U.S. Cl. .................................. 354/173; 354/206; 354/213
[58] Field of Search ................ 354/171, 173, 204–206, 354/213; 352/121, 137, 155, 169; 242/71.4, 71.5

[56] References Cited

U.S. PATENT DOCUMENTS

| | | | |
|---|---|---|---|
| 3,946,409 | 3/1976 | Toyoda | 354/173 |
| 3,999,197 | 12/1976 | Iwashita et al. | 354/173 |
| 4,084,169 | 4/1978 | Iwata et al. | 354/173 |
| 4,086,603 | 4/1978 | Kozuki | 354/173 X |
| 4,196,993 | 4/1980 | Stemme et al. | 354/173 |

Primary Examiner—Lawrence R. Franklin
Assistant Examiner—William B. Perkey
Attorney, Agent, or Firm—Michael J. Striker

[57] ABSTRACT

A still-camera film transport system includes a perforation feeler and cooperating perforation-detecting switch generating a perforation signal. A motor speed sensor generates a signal indicative of whether the motor speed is above or below a certain level. A shutter-state switch generates a signal indicating whether the shutter is in set or unset state. A motor-control switch is controlled from the output of a logic-circuit stage which receives the above three signals. During normal operation before the film end is reached, the perforation signal is used to generate a deenergize-motor signal, but in dependence upon the shutter-state signal. When the film end is reached no further perforations follow, but the transport motor comes to a halt because it cannot pull the film further. The motor-speed signal indicates this and, when applied to the logic-circuit stage, causes the motor to be deenergized if the shutter is in set state.

5 Claims, 2 Drawing Figures

STILL-CAMERA FILM TRANSPORT SYSTEM WITH MOTOR DEENERGIZATION AT END OF FILM

This is a continuation of application Ser. No. 955,475, filed Oct. 26, 1978, now abandoned.

BACKGROUND OF THE INVENTION

The present invention relates to still-camera film transport systems of the type including a perforation feeler which enters into the edge perforations in transported cassette film, with a motor for effecting film transport and also for resetting the shutter after an exposure, and with means for deenergizing the transport motor in response to reentry of the feeler into a perforation at the end of a one-frame film transport operation.

SUMMARY OF THE INVENTION

It is the general object of the invention to provide a still-camera film transport system of the type in question, with which by very simple means and in a very simple way film transport can be reliably controlled, especially deenergization of the film transport motor at the end of the film. In particular, the stopping of the motor at the end of the film should occur very precisely without, however, requiring for example the provision of a special stop-transport marking near the end of the film, or other modifications of the film itself.

In the present invention, this is accomplished using a perforation-detecting switch which furnishes a signal indicating whether or not the feeler has entered into a film perforation, and a motor speed sensor which furnishes a signal indicative of transport-motor speed. These two signals serve as motor-deenergize signals commanding that motor energization be discontinued. These signals are applied to a logic-circuit stage, in the preferred embodiment a simple NAND-gate, which also receives a signal indicating the state of the camera's shutter mechanism, especially whether the shutter mechanism is in set or unset state. During normal operation, i.e., when the end of the film has not yet been reached, film transport is stopped by the logic-circuit stage, by rendering a motor-control switch conductive or non-conductive, in response to a signal from the perforation-detecting switch, although the latter signal is not effective to deenergize the transport motor until the shutter mechanism is reset.

When the end of the film is reached, the perforation associated with the last exposure made is not followed by another such perforation, and therefore the perforation-detecting switch, of itself, would not be capable of discontinuing motor energization. With the present invention, after the last perforation is passed and the film end is reached, the stopping of the transport motor which occurs because the film cannot be pulled further is detected by the aforementioned motor speed sensor, by detecting the fact that the motor speed is below a predetermined value, and the signal indicating this is applied to the aforementioned logic-circuit stage which then deenergizes the transport motor, provided that the shutter mechanism of the camera is reset. This drop in motor speed can actually be the result of a drop in the voltage supplied by the camera's battery or result from the heavy loading on the motor when the end of the film is reached and the motor can pull the film no further.

Various techniques can be used to sense motor speed for the purposes of the present invention. However, it is preferred to use a bistable threshold circuit (e.g., a Schmitt trigger) to detect when the motor-terminal voltage or the motor current is above and below a predetermined level. In the case of a D.C. motor, the voltage across the motor terminals builds up to a steady value during motor-start up as operating speed is reached. Likewise, the current drawn by such motor upon commencement of start-up is initially high and then decreases as operating speed is reached, and a voltage indicative of motor current can, for example, be readily tapped off a resistor connected in the motor current path.

Preferably, the logic-circuit stage is a NAND-gate and the motor-speed signal and perforation-responsive signal are applied to one input of this or an equivalent gate through an OR-gate or the equivalent. This makes it possible to get by with only two logic gates. However, it will be understood that, when the implementation of logical relationships is involved, the logic-gate configuration used can be manipulated or changed to implement a particular logical relationship in a variety of ways.

According to one advantageous feature of the invention, a time-delay stage is interposed between the motor speed sensor and the logic-circuit stage, affording a capacitor-charge or -discharge time delay equal to at least the start-up time normally required by the motor. Thus, during normal operation, as the transport motor is being started up, the signal indicating low motor speed slowly approaches but does not reach a logic level to which the logic-circuit stage can respond and then, when motor start-up is concluded, this signal is terminated and the time-delay stage now charges or discharges in an opposite sense.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
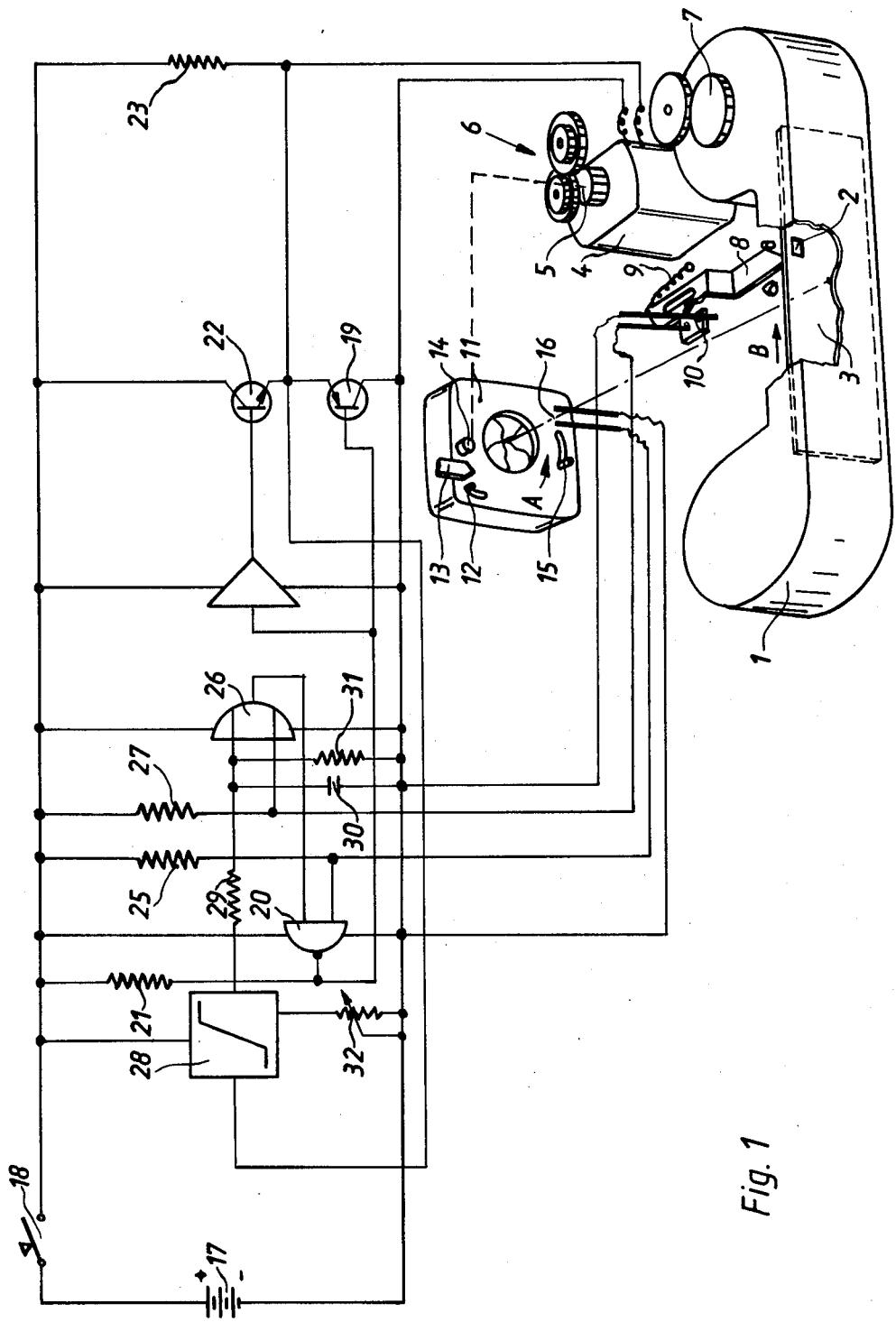
FIG. 1 depicts a first exemplary embodiment of the present invention.

In FIG. 1, numeral 1 denotes a cassette containing photographic film 3 provided with one perforation 2 per film frame. A film transport motor 4 has an output gear 5 which can be coupled to the drive gear 7 of an inserted cassette 1 through the intermediary of a schematically depicted speed-reducing transmission 6. Numeral 8 denotes a per se conventional perforation feeler, normally urged towards the film 3 by a biasing spring 9. Perforation feeler 8 has a projection which controls the state (open or closed) of a perforation-detecting switch 10. When perforation feeler 8 has entered into a film perforation 2, perforation-detecting switch 10 is open, otherwise closed.

Numeral 11 denotes the shutter mechanism of the camera. Shutter mechanism 11 includes a trigger pin 12 which when struck from the right by a trigger member 13 activates the shutter mechanism 11, i.e., so that the shutter opens and then closes again. The shutter mechanism 11 is wound up or otherwise set by means of a setting member 14. Typically, the setting member 14 is driven by a setting mechanism which is, in turn, driven off the film transport motor 4, i.e., so that motor 4 also does the mechanical work involved in resetting the shutter mechanism 11 in preparation for the next triggering thereof. The shutter mechanism 11 is provided with a switch-activating pin 15. When the shutter mechanism is in set state, ready to be triggered, pin 15 occupies the illustrated position. When shutter mechanism 11 is triggered and the shutter opens and then closes, the switch-activating pin 15 moves in the direction of arrow A and closes a shutter-state switch 16. Switch 16 is thus closed when the shutter mechanism is in unset state, waiting to be reset. When the shutter mechanism is then actually reset, switch-activating pin 15 returns to its illustrated position, and shutter-state switch 16 opens again. Of course, such shutter mechanisms are in themselves conventional.

A battery 17 can be connected to the illustrated circuit via a switch 18, e.g., when the user depresses the non-illustrated release button of the camera.

Connected in parallel to D.C. motor 4 is a transistor 19 whose base is connected to the output of a NAND-gate 20. Numeral 21 denotes a base-bias resistor.

Connected in series to motor 4 is a transistor 22 whose collector-emitter path is connected in parallel to a resistor 23, the latter also serving as a load resistor for transistor 19.

The base of transistor 22 is connected in the output circuit of an amplifier 24 whose input, along with the base of transistor 19, is connected to the output of NAND-gate 20. The lower input of NAND-gate 20 is connected via a resistor 25 to the positive terminal of battery 17. However, if shutter-state switch 16 closes, then this input of NAND-gate 20 becomes directly connected to the negative terminal of battery 17. The upper input of NAND-gate 20 is connected to the output of an OR-gate 26. The lower input of OR-gate 26 is connected via a resistor 27 to the positive battery terminal. However, if perforation-detecting switch 10 closes, then this input of OR-gate 26 becomes directly connected to the negative battery terminal.

The upper input of OR-gate 26 is connected to the output of a bistable threshold circuit 28 (e.g., a Schmitt trigger), through the intermediary of a time-delay stage. The time-delay stage comprises a charging resistor 29, a time-delay capacitor 30, and a discharge resistor 31. The threshold or trip level of threshold circuit 28 is adjustable by means of a potentiometer 32. The input of threshold circuit 28 is connected to the junction between the emitter of control transistor 22 and the motor 4.

The illustrated circuit operates as follows:

In FIG. 1, the free end of perforation feeler 8 is shown entered into a film perforation 2 in the film 3. Accordingly, perforation-detecting switch 10 is open. Accordingly, the lower input of OR-gate 26 receives a "1" signal, switch 18 of course already having been closed, e.g., as the user depressed the (non-illustrated) camera release button.

Because an OR-gate produces an output "1" signal in response to even one input "1" signal, a "1" signal is now present on the output of OR-gate 26 and is applied from there to the upper input of NAND-gate 20. With the shutter mechanism 11 set and ready to be triggered, but not yet triggered, shutter-state switch 16 is open, and accordingly a "1" signal is now present on the lower input of NAND-gate 20, as well. As a result, a "0" signal is present at the output of NAND-gate 20. This "0" signal is applied, as a low voltage, to the base of transistor 19, keeping the latter conductive and thereby short-circuiting the film transport motor 4. Also, at this point, transistor 22 is non-conductive, so that current cannot flow through motor 4 sufficient to attempt a film-transport operation.

When the user depresses the (non-illustrated) camera release button, trigger member 13 strikes triggering pin 12 leftwards, thereby triggering the shutter mechanism 11, i.e., so that the shutter then opens and then closes. With the shutter mechanism now in unset state, switch-activating pin 15 presses rightwards against shutter-state switch 16, keeping the latter closed. As a result, a "0" signal is applied to the lower input of NAND-gate 20, and the output signal of NAND-gate 20 is now a "1" signal. This "1" signal is applied to the base of transistor 19, rendering the latter non-conductive, whereas transistor 22 now becomes conductive. Accordingly, the film transport motor 4 is now energized and, via transmission 6, the film 3 is advanced the distance of one frame-length in the direction of arrow B.

As this one-frame film transport operation commences, with the free end of feeler 8 still in a perforation 2, the film pulls feeler 8 rightwards, causing the illustrated slanting cam face at the right side of feeler 8 to slide along the illustrated cam pin to the right of it, as a result of which the feeler 8 retracts from the film perforation 2. Perforation-detecting switch 10 closes, and a "0" signal is now applied to the lower input of OR-gate 26.

With the "1" signal at the lower input of OR-gate 26 now changed to a "0" signal, the output signal of OR-gate 26 is determined by the signal applied to its upper input. This signal is furnished from threshold circuit 28, via time-delay stage 29, 30, 31 and OR-gate 26 as follows:

Threshold circuit 28 produces an output "1" signal during the start-up phase of the now energized film transport motor 4, and then a "0" signal when the motor 4 has reached rated speed, or another predetermined speed value. In the illustrated embodiment, threshold circuit 28 ascertains the speed of the motor 4 by determining whether the voltage across motor 4 is lower than a predetermined level, i.e., during start-up, or has reached the predetermined level, i.e., upon the conclusion of start-up or when a preselected voltage level is reached. It will be understood that when a D.C. motor is being started up the voltage across its terminals builds up from a low value to a steady value as operating speed is reached. It will also be understood that other forms of motor-speed detection could be employed.

To briefly review: Motor 4 becomes energized, initiating film transport, the latter causing feeler B to retract and close perforation-detecting switch 10, causing a "0" signal to appear at the output of OR-gate 26, with the upper input of OR-gate 26 now determining the output signal of the OR-gate 26.

Upon start-up, threshold circuit 28 produces an output "1" signal, because the transport motor 4 has not yet reached full operating speed. This "1" signal is applied to the upper input of OR-gate 26 via the time-delay stage 29, 30, 31. Because switch 18 was open prior to depression of the camera release button, when switch 18 closed time-delay capacitor 30 was in an uncharged state. Accordingly, during motor-start-up the "1" signal at the output of threshold circuit 28 now causes capacitor 30 to charge up towards the voltage level of a logical "1". However, the charging time-constant selected for stage 29, 30, 31 is selected to be at least as long as the start-up time which motor 4 requires. Therefore, during the course of motor start-up the voltage across capacitor 30 does not actually reach the logical "1" level, and so in effect an "0" signal is presistently applied to the upper input of OR-gate 26 throughout motor start-up. Then when motor start-up is completed, i.e., when the predetermined motor speed is reached and threshold circuit 28 produces an output "0" signal, capacitor 30 commences to discharge through discharge resistor 31, and the signal at the upper input of OR-gate 26 therefore continues to be a logical "0". Accordingly, time-delay stage 29, 30, 31 prevents the "1" signal produced by stage 28 during motor start-up from being transmitted to the remainder of the illustrated circuitry. This can be helpful in avoiding logical ambiguity in the states of the illustrated elements during this time.

Throughout this first phase of motor energization, shutter-state switch 16 is kept closed by pin 15, because the shutter mechanism 11 is still in unset state. In particular, because switch 16 is closed, the lower input of NAND-gate 20 is in receipt of a "0" signal. Accordingly, with the shutter mechanism in unset state, there is no way to change the state of NAND-gate 20 by signals applied to its upper input, and therefore a stop signal appearing at the output of OR-gate 26 would be ineffective. Such a stop signal might appear at this time, for example, if the time-delay stage 29, 30, 31 were not present.

During the operation of motor 4, not only does it transport the film 3; in addition, it resets shutter mechanism 11 by turning reset member 14. When the shutter mechanism has been reset, shutter-state switch 16 is open again, and therefore a "1" signal is now present at the lower input of NAND-gate 20. With a "1" signal now present at the lower input of NAND-gate 20, the arrival of a "1" signal at the upper input of NAND-gate 20 would produce an output "0" signal and deenergize motor 4.

During normal operation, i.e., when the end of the film has not yet been reached, this logical "1" stop signal is produced when feeler 8 falls into the next film perforation 2 and again opens switch 10. The output signal of NAND-gate 20 now changes from "1" to "0", transistors 19 and 22 become conductive and non-conductive respectively, and motor 4 is deenergized.

In contrast, if the end of the film had been reached, with no next perforation for feeler 8 to fall into, a stop signal from perforation-detecting switch 10 would not be provided. In that case, the stop signal must come from threshold circuit 28. Specifically, when the end of the film is reached, motor 4 can transport the film 3 no further and therefore comes to a standstill, although it continues to be energized and continues to tug on the film. Because the speed of motor 4 has now dropped, threshold circuit 28 produces an output "1" signal, which charges time-delay capacitor 30. After the elapse of a time-delay interval at least equal to the normal start-up time of motor 4, the voltage across capacitor 30 reaches a level constituting a logical "1" signal for the upper input of OR-gate 26, and a "1" signal accordingly appears at the output of OR-gate 26 and is applied to the upper input of NAND-gate 20. The output signal of NAND-gate 20 now changes from "1" to "0", transistors 19 and 22 become conductive and non-conductive respectively, and the motor 4 is deenergized.

Figure 2:
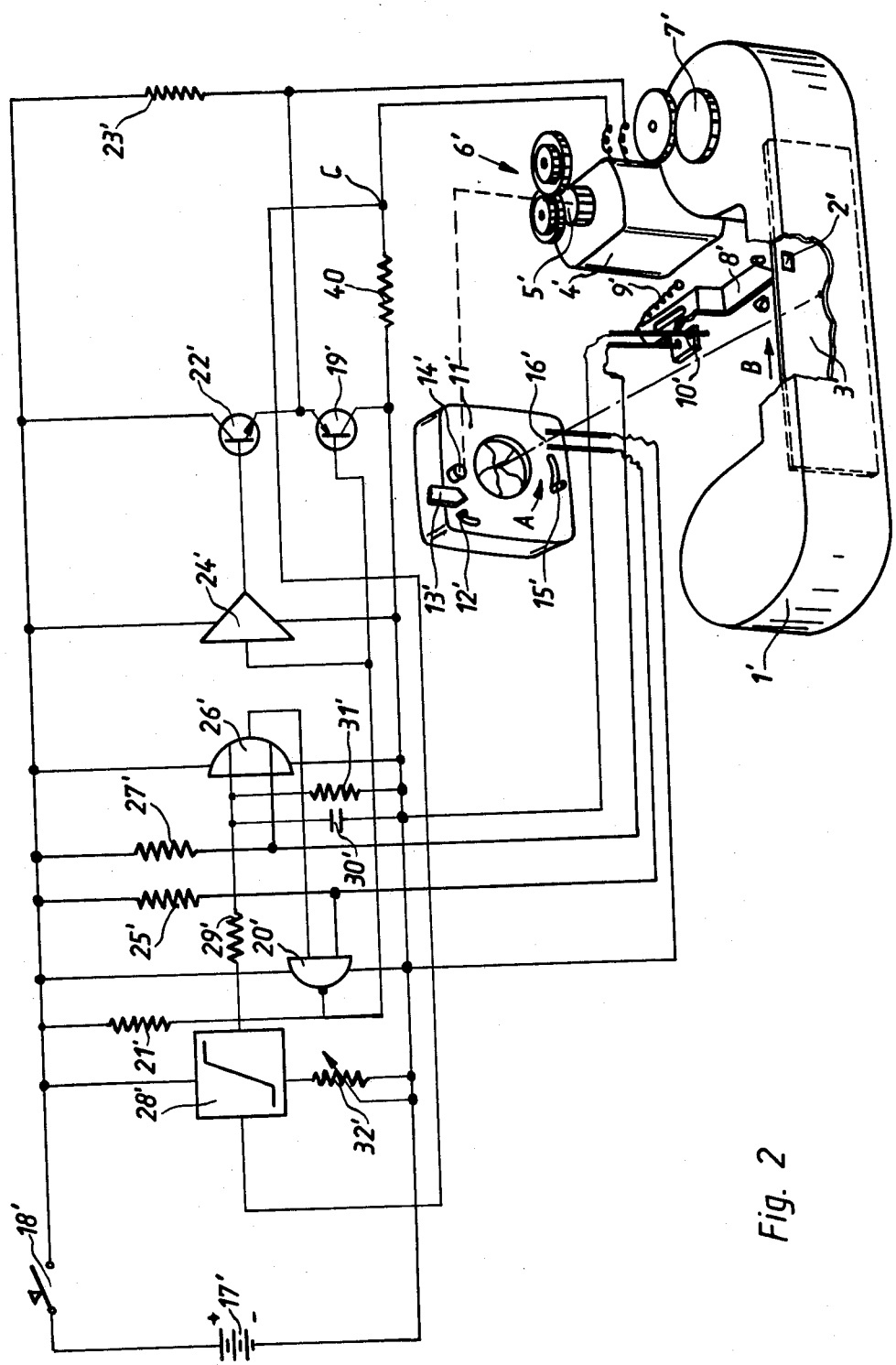
FIG. 2 depicts a second exemplary embodiment.

The embodiment depicted in FIG. 2 is very similar to that of FIG. 1, and corresponding elements are denoted by corresponding primed reference numerals. Here, instead of ascertaining motor speed from the voltage across the motor terminals, a resistor 40 is connected in series with the motor 4, and it is the voltage drop across resistor 40 which serves as the input signal for threshold circuit 28'. Because motor current decreases with increasing speed, unlike motor-terminal voltage, in this embodiment threshold circuit 28' produces an output "0" signal when the input signal thereto is below a predetermined level, i.e., in contrast to the situation of FIG. 1.

In other respects, the operation is as described with respect to FIG. 1.

It will be understood that each of the elements described above, or two or more together, may also find a useful application in other types of circuits differing from the types described above.

While the invention has been illustrated and described as embodied in a particular combination of switches and logic-circuit elements, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A film transport system for use in a still camera which utilizes film in cassette format and a shutter with a set state and an unset state, when the film is perforated at regular intervals with perforations and when each such perforation is associated with a corresponding individual film frame to enable each frame to be aligned with the shutter, comprising:
a drive motor mechanically connected to the film and the shutter and urging the film to advance and urging the shutter to adopt the set state from its unset state after the motor is energized, the drive motor operating in a manner that after such energization, the drive motor will normally reach operating speed in a predetermined period of time;
a perforation sensor fixed to the camera and detecting a perforation and lack of a perforation at a fixed location along a film path;
a shutter sensor fixed to the camera and responsive to state of the shutter;
a drive control means responsive to motor speed;
a switch means connected to the drive motor and energizing and deenergizing the motor; and
a supervisor circuit connected to the sensors, the switch and the drive control, the supervisor circuit operating in a manner so as to energize the motor to advance the film one frame and to cause the shutter to adopt its set state from its unset state and to deenergize the motor after the film has so advanced and after the shutter has so adopted its set state, the supervisor circuit further operating in a manner that in the event the drive motor has been energized for said predetermined period of time and has failed to reach operating speed within said predetermined period of time, the drive motor will be deenergized.

2. The system defined in claim 1, wherein the perforation sensor includes a movable feeler arm and a switch connected to the feeler arm and opening and closing with movement thereof.

3. The system defined in claim 2, wherein the drive control includes a Schmitt trigger having an input and an output, and wherein the input responds to voltage across the drive motor.

4. The system defined in claim 3, wherein the supervisor circuit includes a time delay connected to the output of the Schmitt trigger.

5. The system defined in claim 4, wherein the time delay includes a capacitor charged by the output of the Schmitt trigger.

* * * * *